(12) United States Patent
Engelbrecht (10) Patent No.: US 8,136,428 B2
(45) Date of Patent: Mar. 20, 2012

(54) NON-REVERSIBLE FASTENER

(76) Inventor: Bryan Engelbrecht, Richmond, TX (US)

( * ) Notice: Subject to any disclaimer, the term of this patent is extended or adjusted under 35 U.S.C. 154(b) by 1051 days.

(21) Appl. No.: 12/031,878

(22) Filed: Feb. 15, 2008

(65) Prior Publication Data

US 2009/0208309 A1    Aug. 20, 2009

(51) Int. Cl.
*B25B 13/02* (2006.01)
(52) U.S. Cl. ............. 81/125; 81/900; 411/315; 411/209
(58) Field of Classification Search .................. 411/190, 411/209, 210, 211, 221, 315, 316, 317, 318, 411/326, 327, 418, 419
See application file for complete search history.

(56) References Cited

U.S. PATENT DOCUMENTS

| | | | | |
|---|---|---|---|---|
| 179,994 A * | 7/1876 | Brallier | ......................... | 411/327 |
| 1,210,669 A * | 1/1917 | Mike et al. | ..................... | 411/211 |
| 1,288,215 A * | 12/1918 | Savickis | ........................ | 411/326 |
| 1,362,509 A * | 12/1920 | Raspet | ........................... | 411/327 |
| 1,371,639 A * | 3/1921 | Miller | ............................ | 411/326 |
| 2,766,798 A * | 10/1956 | Raspet | ........................... | 411/327 |
| 3,272,249 A * | 9/1966 | Houston | ........................ | 411/318 |
| 5,544,555 A * | 8/1996 | Corley et al. | ................... | 81/125 |
| 6,810,774 B2 * | 11/2004 | Hsien | .............................. | 81/125 |
| 6,955,105 B2 * | 10/2005 | Chen | ............................... | 81/125 |

\* cited by examiner

*Primary Examiner* — Victor Batson
*Assistant Examiner* — James Cline, Jr.
(74) *Attorney, Agent, or Firm* — Wong, Cabello, Lutsch, Rutherford & Brucculeri, LLP (57) ABSTRACT

Non-reversing fasteners include a bolt having a groove defined along the thread, and a nut having a biased tooth disposed in an internal pocket. When the nut is threaded onto the bolt, the biased tooth does not engage the groove. When the nut is reversed off the bolt, the biased tooth stays in an extended position and engages the groove, preventing it from reversing. A tool positions on the nut and moves the biased tooth from the extended position to a retracted position, allowing the nut to reverse off the bolt. The tool can be another nut having a magnet for moving the tooth from the extended to the retracted position. A reverse arrangement can have a bolt with a biased tooth and a nut having a groove. A tool in the form of a magnetized rod can fit into an axial bore in the bolt to move the tooth.

50 Claims, 6 Drawing Sheets

NON-REVERSIBLE FASTENER

BACKGROUND

Fasteners such as bolts and nuts may tend to back or reverse out over time due to temperature changes, vibration, rotation, etc. In addition, fasteners may be tampered with by people attempting to unhook or open an item having fasteners. In some of these situations, it is helpful to have a fastener that cannot back or reverse out. Castle nuts are one type of nut that resists backing out. The castle nuts have slots that engage a cotter pin inserted through a bolt so that the nut cannot rotate on the bolt. Other nuts may have threads that use a plastic O-ring to create an interference fit with a bolt and prevent reversing out.

DETAILED DESCRIPTION

Figure 1:
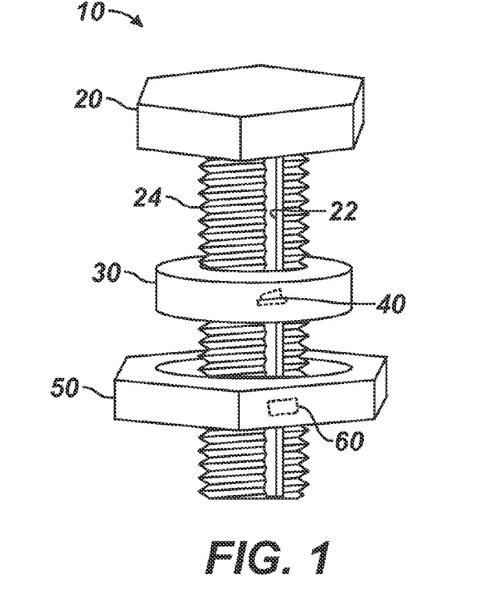
FIG. 1 illustrates a non-reversible fastener apparatus according to certain teachings of the present disclosure.

A non-reversible fastener apparatus 10 illustrated in FIG. 1 includes a bolt 20, a locking nut 30, and a releasing tool 50. The locking nut 30 threads onto the bolt 20 and has an internal lock 40 that prevents the nut 30 from being reversed off the bolt 20 by engaging a longitudinal groove 22 along the bolt's thread 24. To release the nut 30, the releasing tool 50 fits over or onto the locking nut 30, and an internal release 60 releases the nut's lock 40, preventing the lock 40 from engaging the groove 22 and allowing the nut 30 to be reversed off the bolt 20.

Figure 2A:
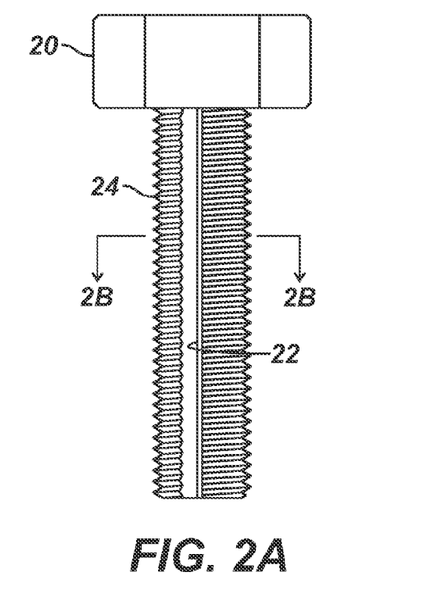
FIG. 2A illustrates a bolt of the non-reversible fastener of FIG. 1.
Figure 2B:
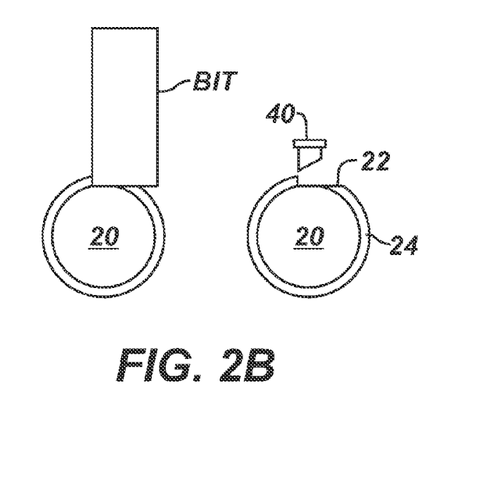
FIGS. 2B-2C schematically illustrate techniques for producing locking grooves in the bolt of FIG. 2A.
Figure 2C:
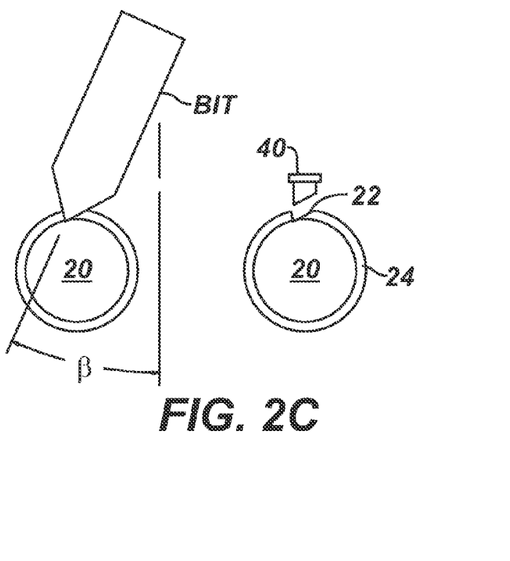

As shown in FIG. 2A, the bolt's longitudinal groove 22 can extend along the entire thread 24 of the bolt 20, although other implementations may have a groove extending less than the entire length, more than one groove, etc. The groove 22 can be formed by machining the bolt 20 with a bit or the like. For example and as shown in FIG. 2B along the central axis of the bolt 20, a square ended bit can mill out a rectilinear shaped groove 22 in the outside of the bolt 20 for engaging a lock 40 (shown here as a tooth with an angled end). The groove 22 need only be machined into the thread 24 of the bolt 20 and not into the bolt's shaft. Moreover, the groove 22 need only remove 10% or less of the thread 24. Alternatively and as shown in FIG. 2C, a pointed bit can mill out an angled shaped groove 22 removing less material of the thread 24, yet still enabling a tooth of the lock 40 to engage the groove 22.

Figure 3A:
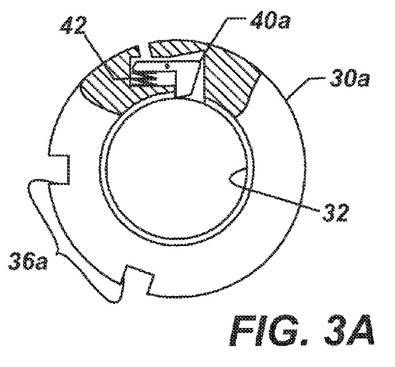
FIGS. 3A-3B illustrate plan views of a locking nut and a releasing tool of a first non-reversible fastener apparatus.

Various locking nuts 30 and releasing tools 50 can be used with such a bolt 20. FIG. 3A shows a locking nut 30a having a locking tooth 40a positioned in an internal pocket of the nut 30a. Biased by a spring 42, the tooth 40a's end positions into the nut's internal thread 32 to potentially engage a bolt's groove (e.g., 22; FIG. 2A). To turn the bolt 30, a releasing tool 50a shown in FIG. 3B having an internal opening 52 fits over the locking nut 30a. To help both align and turn the nut and tool, the tool's alignment ridges 56a fit into alignment slots 36a on the nut 30a. With the tool 50a positioned onto the nut 30a, a pin 60a can thread into a side opening 54 of the tool 50a and engage the biased tooth 40a, pivoting it away from the nut's internal thread 32 and preventing potential engagement with a bolt's groove (e.g., 22; FIG. 2A). In this way, an operator using an appropriate tool such as a wrench can turn the releasing tool 50a along with the locking nut 30a and reverse them off a bolt (20) without the tooth 40a engaging the bolt's groove (22).

Figure 4A:
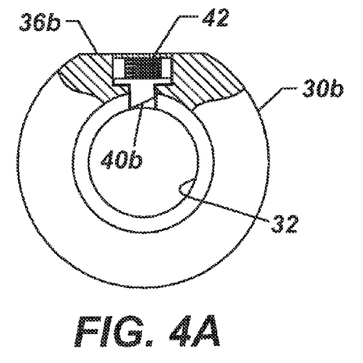
FIGS. 4A-4B illustrate plan views of a locking nut and a releasing tool of a second non-reversible fastener apparatus.
Figure 4B:
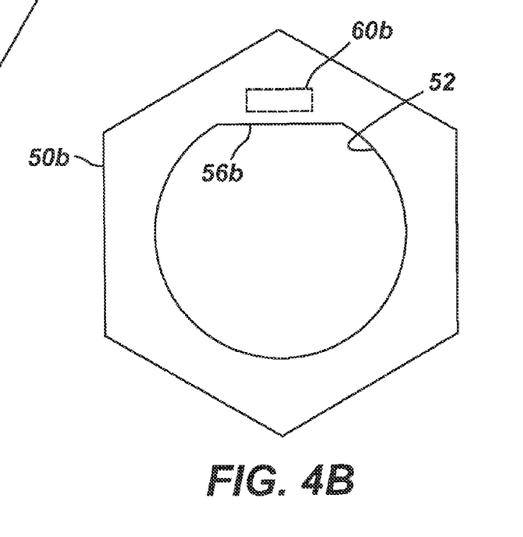

As opposed to the mechanical arrangement of the locking nut and releasing tool discussed above, other arrangements can use magnets to release the locking engagement of the nut with the bolt's groove. In FIG. 4A, for example, a locking nut 30b has a locking tooth 40b positioned in an internal pocket and biased by a spring 42. In FIG. 4B, a releasing tool 50b has a magnetic element 60b, such as a rare earth magnet, embedded therein to release the tooth 40b by magnetically moving the tooth 40b against the bias of the spring 42 from an extended position to a retracted position. In particular, the tool's opening 52 fits onto the nut 30b with the tool's alignment face 56b aligned with the nut's face 36b. Once positioned, the magnetic element 60b attracts the metal tooth 40b against the bias of the spring 42 and moves it away from the nut's internal thread 32, preventing the tooth 40b's potential engagement with a bolt's groove (22). Although alignment faces 36b and 56b can help in turning the nut 30b and tool 50b in addition to providing alignment, use of such alignment features is not strictly necessary because the magnetic element 60b having sufficient strength can allow the tool 50b to rotate the nut 30b even if it has a circular outer profile.

Various techniques can be used to install a tooth and spring in a locking nut. In one example and as shown in FIG. 5B, a locking tooth (e.g., 40c) can fit into a pocket 31 defined in the outside of the nut 30c. The pocket 31 has a central opening 33 that passes all the way through to the nut's internal thread for passage of the tooth's distal end. The pocket 31 also has a shoulder for engaging the tooth (40c) when fully extended. To enclose the tooth (40c) and spring (42) within the pocket 31, a metal cover plate (not shown) can fit within a shallow recessed area 35 surrounding the pocket 31 and can attach to the outside of the nut 30c by epoxy, solder, weld, or the like.

The releasing tools discussed previously (e.g., 50b; FIG. 4B) defined an axial opening all the way therethrough so that the tool could fit onto the nut. As shown in FIGS. 5C-5D, however, a releasing tool 50c can have its opening 52 defined only partially therethrough and can have a smaller opening 53 for the bolt that also forms a ledge for positioning against the end of the nut. This allows the tool 50c to be partially held stable on the nut when being used.

Figure 5A:
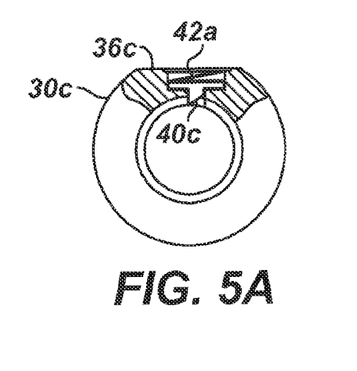
FIGS. 5A-5D illustrate various views of a locking nut and a releasing tool of a third non-reversible fastener apparatus.
Figure 5B:
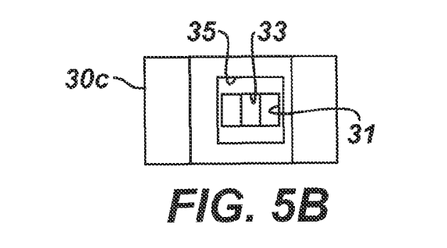
Figure 5C:
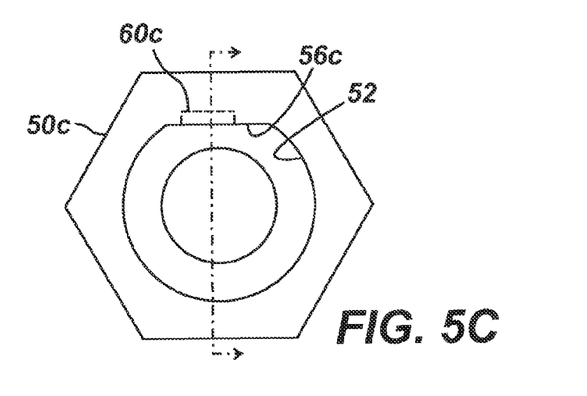
Figure 5D:
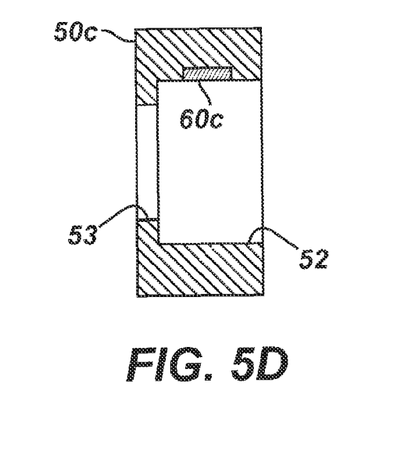
Figure 6A:
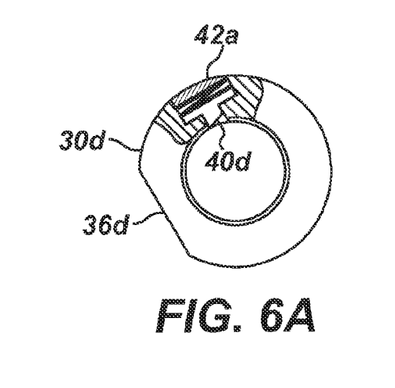
FIG. 6A-6B illustrate plan views of a locking nut and a releasing tool of a fourth non-reversible fastener apparatus.
Figure 6B:
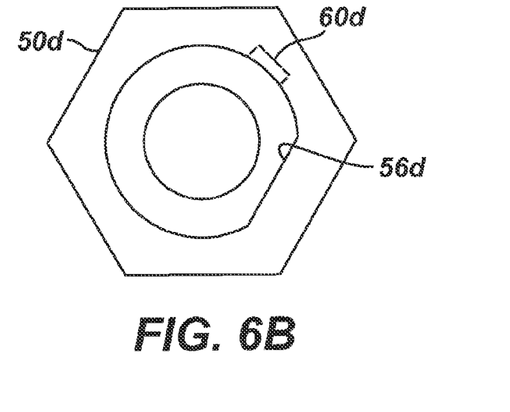

In FIGS. 5A-5B, the alignment faces 36c, 56c are aligned with the locking teeth 40c and the magnet 60c, however this is not strictly necessary as shown in FIGS. 6A-6B. Here, the nut 30d has a misaligned arrangement of tooth 40d and face 36d, and the tool 50d has a corresponding magnet 60d and face 56d arrangement.

Figure 3B:
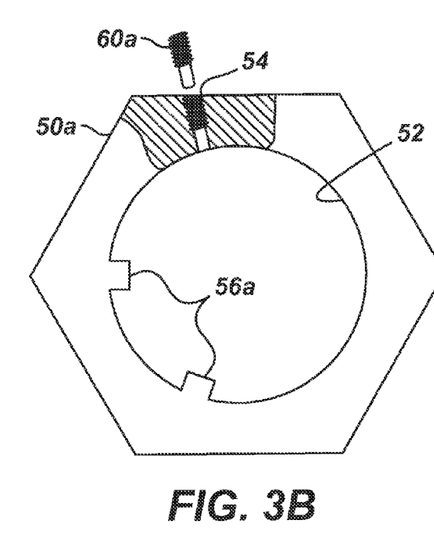
Figure 7A:
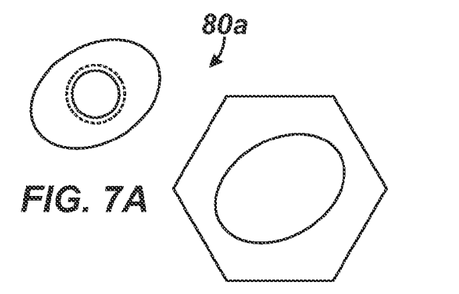
FIGS. 7A-7F illustrate plan views of various arrangements of locking nuts and releasing tools.
Figure 7B:
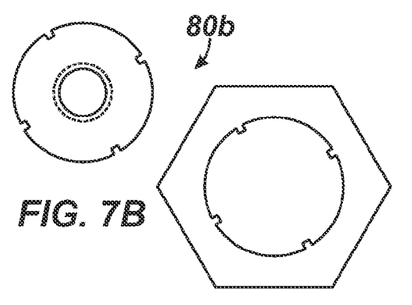
Figure 7C:
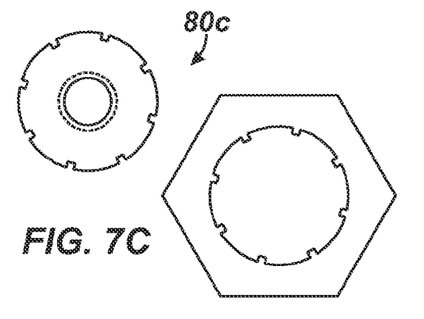
Figure 7D:
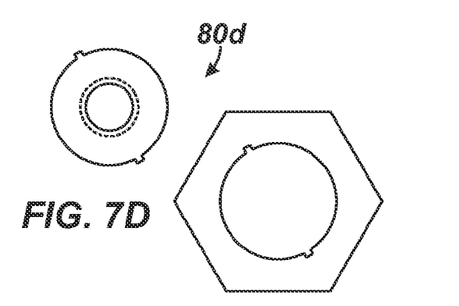
Figure 7E:
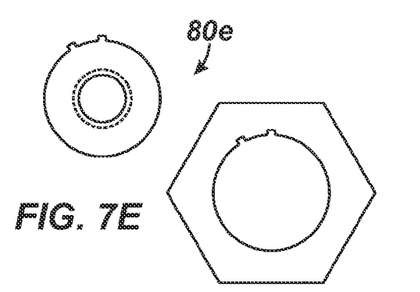
Figure 7F:
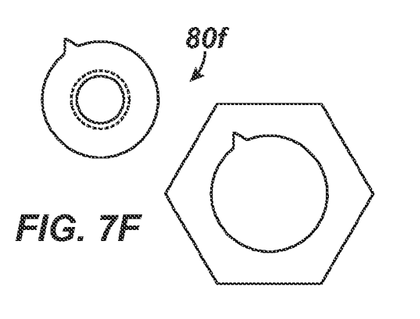

In previous embodiments, alignment ridges and slots (e.g., 36a, 56a; FIGS. 3A-3B) as well as alignment faces (e.g., 36b, 56b; FIGS. 4A-4B) enable operators to align the releasing tool with the nut so that the locking tooth can be disengaged and the tool can rotate the nut. As shown in FIGS. 7A-7F, various other arrangements 80a-80f can also be used. For example, FIG. 7A shows a nut and tool arrangement 80a in which the nut has an oblong outer shape and the tool has a complementary inner shape for both aligning the nut and tool and allowing the tool to rotate the nut. FIGS. 7B-7C show arrangements 80b and 80c in one configuration with ridges on the tool and slots on the nut, while FIGS. 7D-7F show arrangements in opposite configurations. Likewise, the arrangements of FIGS. 7B-7D are symmetrical, while the arrangement 80e in FIG. 7E is not. In addition, the arrangement in FIG. 7F has only one ridge and slot as opposed to the multiple ridges and slots in FIGS. 7B-7F. Moreover, the ridge and slot in FIG. 7E are not square in profile as in other arrangements. Other arrangements in addition to those shown are also possible.

Figure 8:
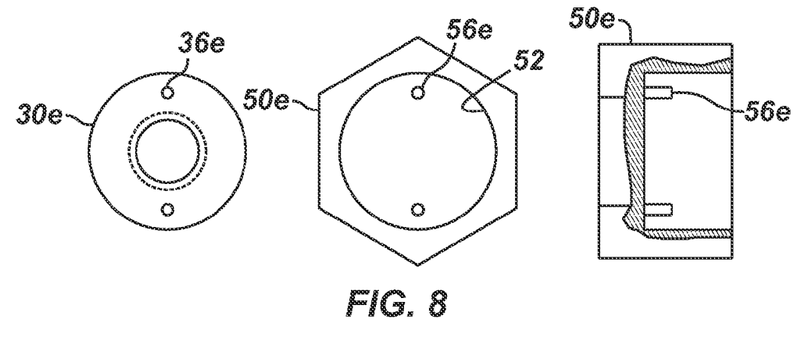
FIG. 8 illustrates another arrangement of a locking nut and a releasing tool.

As opposed to ridge/slot and face arrangements, the nut and tools can use posts and hole arrangements. As shown in FIG. 8, the nut 30e has one or more axial holes 36e (two are shown), while the tool 50e has a corresponding arrangement of one or more axial posts 56e. These posts 56e insert into the holes 36e to align the magnet (not shown) with the tooth (not shown) and allow an operator to simultaneously turn both the nut 30e and tool 50e.

All of the various arrangements discussed above for aligning nuts and tools can be configured for symmetrical or asymmetrical alignment. Moreover, they can be configured so that the nut and tool align in only one orientation allowing only one tool with a certain arrangement to be used with one nut having the corresponding arrangement. This allows the tools and nuts to provide a key/lock form of arrangement so that only specific operators with an appropriate tool will be able to reverse out a given nut. As will be appreciated, this may have some benefit for maintenance, security, and other considerations.

Figure 9A:
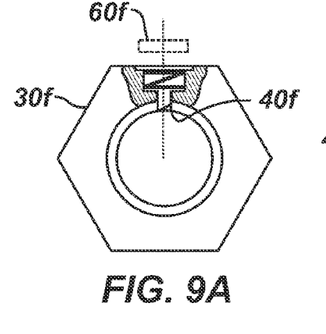
FIGS. 9A-9C illustrate plan views of locking nuts having a hexagonal shape and one or more locking teeth.
Figure 9B:
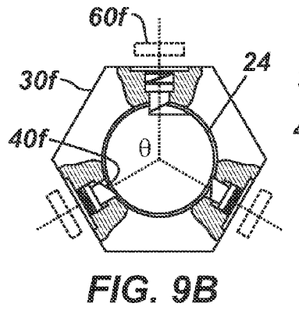
Figure 9C:
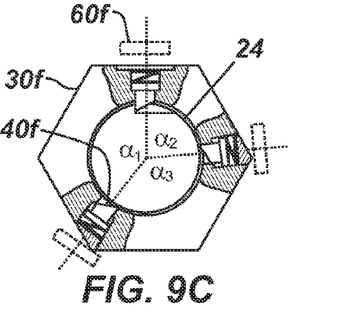

FIG. 9A shows a locking nut 30f having a hexagonal profile of a conventional nut, as opposed to the generally round profiles shown previously. This allows the nut 30f to be handled like a conventional nut. In FIG. 9A, the nut 30f has only one tooth 40f for alignment with one magnet 60f. As shown in FIGS. 9B-9C, however, the nut 30f (as well as all of the other various nuts disclosed herein) can have multiple teeth 40f for simultaneous alignment with multiple magnets 60f. These teeth 40f can be arranged symmetrically as shown in FIG. 9B at the same angle θ relative to one another. Alternatively, the teeth 40f can be arranged asymmetrically as shown in FIG. 9C at different angles $\alpha_1$, $\alpha_2$, and $\alpha_3$, thereby permitting only one orientation of a tool having multiple magnets 60f to reverse the nut 30f of FIG. 9C off a grooved bolt.

Figures 10A, 10B, 10C, 10D, 10E:
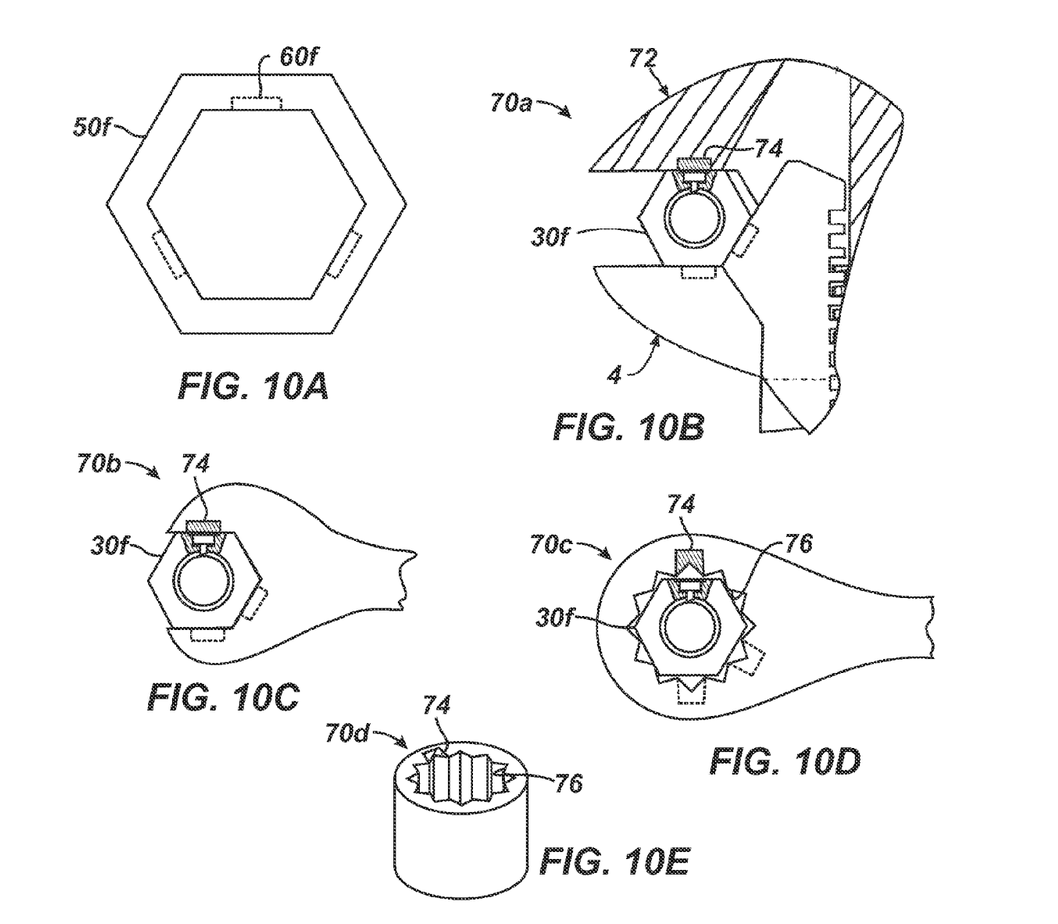
FIGS. 10A-10E illustrate various releasing tools for the locking nuts of FIGS. 9A-9C.

Because the nut 30f has a conventional hexagonal profile, various tools can be used for both threading and releasing the nut 30f from a grooved bolt. In FIG. 10A, for example, a releasing tool 50f has an inner profile 52f suitable for the conventionally shaped nut 30f and also has an outer profile shaped like a hexagonal nut for use with a conventional tool, such as a wrench. The tool 50f has one or more magnets 60f positioned to magnetically move the one or more teeth 40f on the nut 30f.

FIG. 10B shows an adjustable wrench 70a for use with the nut 30f of FIGS. 9A-9C. The wrench 70a has one or more magnets 74 embedded in the fixed jaw 72 and/or the moveable jaw 74 to magnetically move the one or more teeth 40f on the nut 30f when handled by an operator. Similarly, FIG. 10C shows an open end wrench 70b having fixed jaws and one or more magnets 74, and FIG. 10D shows a closed end wrench 70c having a socket 76 lined with one or more magnets 74. In addition to these, FIG. 10E shows a socket 70d for a socket wrench that has one or more magnets 74 disposed adjacent an inner surface. These various tools 70a-70d can have only one magnet 74 so that the tool can be used in only one orientation with a nut having one tooth (e.g., FIG. 9A). Alternatively, these tools 70a-70d can have several redundantly placed magnets 74 so the tool can be used in multiple orientations with the singled toothed nut (e.g., FIG. 9A). Further still, these tools 70a-70d can have several magnets 74 so that the tool can be used in one or more orientations with a multiple-toothed nut (e.g., FIG. 9B or 9C). As opposed to the conventional hexagonal shape, these tools can have complementary shapes (i.e., circular, oblong, ridged, slotted, etc.) for use with other locking nuts disclosed herein. Finally, these tools 70a-70d can be formed using conventional practices of casting and machining, and the magnets 74 can be installed in pockets using epoxy, welding, soldering, etc.

Figures 11A, 11B, 11C, 11D, 12A, 12B:
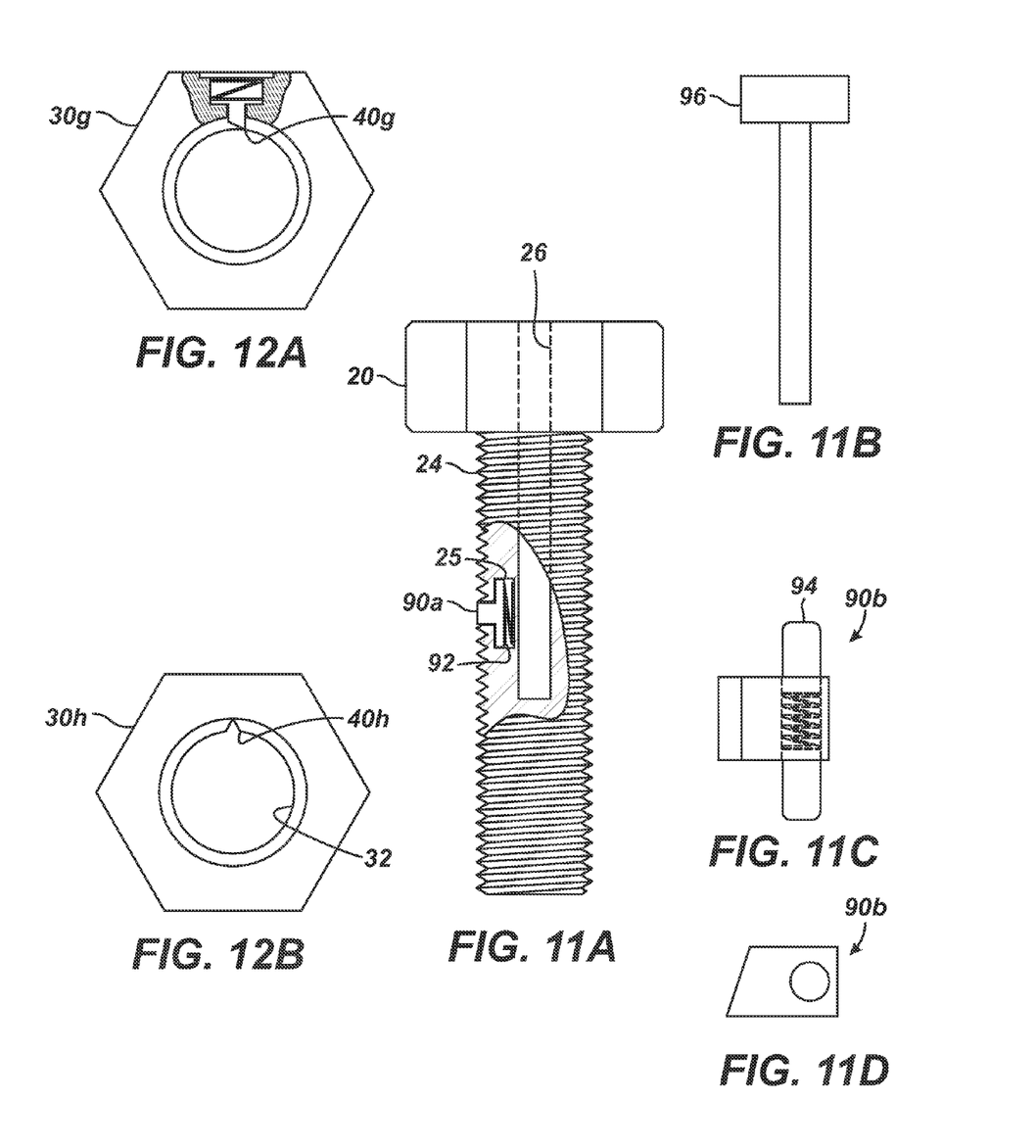
FIG. 11A illustrates a bolt of a non-reversible fastener apparatus having a locking tooth.
FIG. 11B illustrates a releasing tool for the bolt in FIG. 11A.
FIGS. 11C-11D illustrate plan and side views of a locking tooth for the bolt of FIG. 11A.
FIGS. 12A-12B illustrate plan views of locking nuts for the bolt of FIG. 11A.

In previous embodiments such as FIG. 1 and elsewhere, the bolt 20 included a groove 22 while the locking nut 30 included a locking tooth 40. FIGS. 11A through 12B illustrate a reverse arrangement. As shown in FIG. 11A, a bolt 20 has a locking tooth 90a and spring 92 disposed in an internal pocket 25, and the tooth 90a is biased to extend out to the thread 24 lining the bolt's shaft. A channel 26 defined axially through the bolt's shaft receives a magnetized release tool 96 (FIG. 11B) to move the locking tooth 90a inward in the pocket 25 against the bias of the spring 92.

In one arrangement, the locking tooth 90a and spring 92 can be inserted into the pocket 25 from the back via the axial channel 26, which can then be closed using a metal plate by epoxy, solder, or the like. Alternatively, a locking tooth such as 90b in FIGS. 11C-11D can insert into the pocket 25 via its outside opening along the thread 24. For example, the spring 92 can be inserted into the front opening of the pocket 25 along the thread 24. Then, biased engagement arms 94 on the nut 90b can be squeezed to fit the tooth 90b in the pocket 25. Once inserted, the arms 94 extend out and hold the tooth 90b in the bolt's pocket 25.

Such a locking tooth 90a on the bolt 20 as in FIG. 11A can be used with a locking nut 30g also having a tooth 40g such as shown in FIG. 12A. In this way, the two teeth 90a and 40g can meet when the nut 30g is threaded on the bolt 20, and the angled ends of the teeth 90a and 40g may allow them to pass one another in one direction but not the opposite. Alternatively, a locking nut 30h defining a groove 40h in its internal thread 32 can also be used with the bolt of FIG. 11A.

Similar techniques to those discussed above with reference to 11C-11D can be used when installing a similar tooth 90b and spring 92 in a pocket defined in the threaded opening of a locking nut, such as those disclosed, for example, in FIGS. 4A, 5A, 6A, 9A, etc. In this way, the pocket can be formed in the threaded opening of such a locking nut, and the tooth 90b and spring 92 can fit insert through the front opening of the pocket.

In addition, similar techniques to those discussed above with reference to 5B, 11A, and 11C-11D for installing a tooth and spring in a component can be used to retrofit an existing structural component, bolt, nut, or the like for locking engagement in accordance with the present disclosure. In other words, any existing structural component (e.g., bracket, brace, hinge, plate, etc.) or any existing nut or the like having a threaded hole can be retrofitted to include a tooth and spring for locking engagement with a grooved bolt. Such retrofitting may or may not allow for release of the tooth using one of the releasing tools and techniques disclosed herein. In some situations, releasing of the tooth may not be desired, for example, so that the grooved bolt would remain locked into the retrofitted hole without the ability to reverse out unless machined. Similarly, any existing bolt such can be fitted with a locking tooth 90a, spring 92, and pocket 25 as disclosed in FIG. 11A and can be used in any conventional threaded hole in a structural component (e.g., bracket, brace, hinge, plate, etc.) that has been modified to include either its own locking tooth or a groove according to the techniques discussed above.

Several embodiments of non-reversible fastener apparatus have been disclosed above. It will be appreciated that any of the various features discussed in one embodiment may be applied to other embodiments disclosed herein. The teachings of the present disclosure can be applied to any type of fastener no matter what size, shape, or style of thread. The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A fastener system for a workpiece, comprising:
    a fastener having a threaded surface with a pocket communicating with the threaded surface and having a tooth disposed in the pocket, the tooth being movable to an extended position at least partially extending to the threaded surface, the tooth being movable to a retracted position away from the threaded surface, the tooth in the extended position at least partially preventing rotation of the fastener in at least one direction when threaded with the workpiece, the tooth in the retracted position permitting rotation of the fastener in the at least one direction when threaded with the workpiece; and
    a tool positionable adjacent the fastener and having a magnetic element, the magnetic element disposing relative to the tooth and magnetically moving the tooth from the extended position to the retracted position.

2. The fastener system of claim 1, wherein the fastener comprises a nut having an opening, the opening having the threaded surface disposed internally therein.

3. The fastener system of claim 2,
    wherein the nut has a first surface defining at least one slot; and
    wherein the tool has a second surface having at least one protrusion, the at least one protrusion engaging in the at least one slot and adapted to rotate the nut.

4. The fastener system of claim 3, wherein the first surface is a top surface of the nut, the at least one slot defined in the top surface; and wherein the second surface is an inner top surface of the tool, the at least one protrusion extending from the inner top surface.

5. The fastener system of claim 4, wherein the nut has a cylindrical outside surface, wherein the tool has a cylindrical inside surface disposing around the cylindrical outside surface, the inner top surface defining a second opening aligning with the threaded opening of the nut.

6. The fastener system of claim 5, wherein the tool has an outside surface adapted to be engaged by a wrench or a socket.

7. The fastener system of claim 1, wherein the fastener comprises a bolt having a shaft, the shaft having the threaded surface disposed externally thereon.

8. The fastener system of claim 1, further comprising a spring disposed in the pocket and biasing the tooth to the extended position.

9. The fastener system of claim 1, wherein the fastener comprises a plurality of teeth disposed in a plurality of pockets and being movable between extended and retracted positions.

10. The fastener system of claim 1, wherein the tool is adapted to rotate the fastener.

11. The fastener system of claim 10, wherein the tool comprises a nut, wrench, or socket.

12. The fastener system of claim 1, wherein the tool comprises a plurality of magnetic elements.

13. A fastener system, comprising:
    a first component having a first threaded surface and having a groove at least partially transverse thereto;
    a second component having a second threaded surface threadable with the first threaded surface and having a tooth, the tooth being movable between an extended position and a retracted position relative to the second threaded surface, the tooth in the extended position being engageable with the groove in at least one direction, the tooth in the retracted position being unengageable with the groove in the at least one direction; and
    a tool positionable relative to the second component and having a magnetic element, the magnetic element disposing relative to the tooth and magnetically moving the tooth from the extended position to the retracted position.

14. The fastener system of claim 13, wherein a spring biases the tooth toward the extended position.

15. The fastener system of claim 13, wherein the second component comprises a plurality of teeth disposed about the second component, and wherein the tool comprises a plurality of magnetic elements disposed about the tool, each of the magnetic elements magnetically moving a corresponding one of the teeth from the extended position to the retracted position when positioned relative thereto.

16. The fastener system of claim 13, wherein—
    the first component comprises a bolt having a threaded shaft as the first threaded surface and having the groove formed at least partially transverse to the thread of the shaft, and
    the second component comprises a nut having a threaded opening as the second threaded surface theadeable onto the threaded shaft, the nut having the tooth biased toward the threaded opening.

17. The fastener system of claim 16, wherein the tool comprises a wrench having the magnetic element disposed in a jaw of the wrench.

18. The fastener system of claim 16, wherein the tool comprises a socket having the magnetic element disposed adjacent an inner surface.

19. The fastener system of claim 16,
    wherein the nut has a first surface defining at least one slot; and
    wherein the tool has a second surface having at least one protrusion, the at least one protrusion engaging in the at least one slot and adapted to rotate the nut.

20. The fastener system of claim 19, wherein the first surface is a top surface of the nut, the at least one slot defined in the top surface; and wherein the second surface is an inner top surface of the tool, the at least one protrusion extending from the inner top surface.

21. The fastener system of claim 20, wherein the nut has a cylindrical outside surface, wherein the tool has a cylindrical inside surface disposing around the cylindrical outside surface, the inner top surface defining a second opening aligning with the threaded opening of the nut.

22. The fastener system of claim 21, wherein the tool has an outside surface adapted to be engaged by a wrench or a socket.

23. The fastener system of claim 13, wherein—
the first component comprises a nut having a threaded opening as the first threaded surface and having a groove formed at least partially transverse to the thread of the opening; and
the second component comprises a bolt having a threaded shaft as the second threaded surface, the bolt having the tooth biased outward to the threaded shaft.

24. A fastener system for a workpiece, comprising:
a fastener having a threaded surface and a tooth, the threaded surface having a pocket communicating with the threaded surface, the tooth disposed in the pocket and being movable to an extended position at least partially extending to the threaded surface, the tooth being movable to a retracted position away from the threaded surface, the tooth in the extended position at least partially preventing rotation of the fastener in at least one direction when threaded with the workpiece, the tooth in the retracted position permitting rotation of the fastener in the at least one direction when threaded with the workpiece; and
a rod positionable within an axial bore of the fastener and having a magnetic element moving the tooth from the extended position to the retracted position when positioned relative thereto.

25. The fastener system of claim 24, wherein the fastener comprises a bolt having a shaft, the shaft having the threaded surface disposed externally thereon and having the axial bore extending therein.

26. The fastener system of claim 24, further comprising a spring disposed in the pocket and biasing the tooth to the extended position.

27. The fastener system of claim 24, wherein the fastener comprises a plurality of teeth disposed in a plurality of pockets and being movable between extended and retracted positions, and wherein the rod comprises a plurality of magnetic elements.

28. A fastener system, comprising:
a first component having a first threaded surface and having a groove at least partially transverse thereto;
a second component having a second threaded surface threadable with the first threaded surface and having a plurality of teeth disposed about the second threaded surface, each tooth being movable between an extended position and a retracted position relative to the second threaded surface, each tooth in the extended position being engageable with the groove in at least one direction, each tooth in the retracted position being unengageable with the groove in the at least one direction; and
a tool positionable relative to the second component and having a plurality of magnetic elements disposed about the tool, each of the magnetic elements magnetically moving a corresponding one of the teeth from the extended position to the retracted position when positioned relative thereto,
wherein the teeth and the magnetic elements are arranged for only one orientation relative to one another.

29. The fastener system of claim 28, wherein springs bias the teeth toward the extended position.

30. The fastener system of claim 28, wherein—
the first component comprises a nut having a threaded opening as the first threaded surface and having the groove formed at least partially transverse to the thread of the opening; and
the second component comprises a bolt having a threaded shaft as the second threaded surface, the bolt having the teeth biased outward to the threaded shaft.

31. The fastener system of claim 28, wherein—
the first component comprises a bolt having a threaded shaft as the first threaded surface and having the groove formed at least partially transverse to the thread of the shaft, and
the second component comprises a nut having a threaded opening as the second threaded surface theadeable onto the threaded shaft, the nut having the teeth biased toward the threaded opening.

32. The fastener system of claim 31, wherein the tool comprises a wrench having the magnetic elements disposed in a jaw of the wrench.

33. The fastener system of claim 31, wherein the tool comprises a socket having the magnetic elements disposed adjacent an inner surface.

34. The fastener system of claim 31,
wherein the nut has a first surface defining at least one slot; and
wherein the tool has a second surface having at least one protrusion, the at least one protrusion engaging in the at least one slot and adapted to rotate the nut.

35. The fastener system of claim 34, wherein the first surface is a top surface of the nut, the at least one slot defined in the top surface; and wherein the second surface is an inner top surface of the tool, the at least one protrusion extending from the inner top surface.

36. The fastener system of claim 35, wherein the nut has a cylindrical outside surface, wherein the tool has a cylindrical inside surface disposing around the cylindrical outside surface, the inner top surface defining a second opening aligning with the threaded opening of the nut.

37. The fastener system of claim 36, wherein the tool has an outside surface adapted to be engaged by a wrench or a socket.

38. A fastener system, comprising:
a nut having a threaded opening and having a groove formed at least partially transverse to the thread of the opening;
a bolt having a threaded shaft and having a tooth, the threaded shaft threadable with the threaded opening and having an axial bore therein, the tooth biased outward to the threaded shaft and being movable between an extended position and a retracted position relative to the threaded shaft, the tooth in the extended position being engageable with the groove in at least one direction, the tooth in the retracted position being unengageable with the groove in the at least one direction; and
a tool positionable relative to the bolt, the tool having a magnetic element positionable into the axial bore in the threaded shaft of the bolt and magnetically moving the tooth from the extended position to the retracted position when positioned relative thereto.

39. The fastener system of claim 38, wherein a spring biases the tooth toward the extended position.

40. The fastener system of claim 38, wherein the bolt comprises a plurality of teeth disposed thereon, and wherein the tool comprises a plurality of magnetic elements disposed thereon, each of the magnetic elements magnetically moving a corresponding one of the teeth from the extended position to the retracted position when positioned relative thereto.

41. The fastener system of claim 40, wherein the teeth and the magnetic elements are arranged for only one orientation relative to one another.

42. A fastening method, comprising:
defining a pocket in a first threaded surface of a first fastener component;
disposing a tooth in the pocket;
biasing the tooth to an extended position at least partially extending to the first threaded surface, the tooth in the extended position preventing threading with the first fastener component in at least one direction; and
disposing a magnetic element in a second surface of a tool positionable adjacent a first surface of the first fastener component, the magnetic element magnetically moving the tooth from the extended position to the retracted position.

43. The method of claim 42, wherein the first fastener component comprises a nut having an opening with the first threaded surface formed internally therein.

44. The method of claim 42, wherein the first fastener component comprises a bolt having a shaft with the first threaded surface formed externally thereon.

45. The method of claim 42, wherein biasing the tooth comprises disposing a spring in the pocket.

46. The method of claim 42, wherein biasing the tooth comprises making the tooth movable to a retracted position away from the first threaded surface.

47. The method of claim 46, wherein making the tooth movable comprises making the tooth magnetically attractable against the bias.

48. The method of claim 42, further comprising:
defining a groove in a second threaded surface of a second fastener component, the groove engageable with the tooth in the extended position when the first and second threaded surfaces are threaded together.

49. The method of claim 48, wherein the second fastener component comprises a nut having an opening with the second threaded surface formed internally therein.

50. The method of claim 48, wherein the second fastener component comprises a bolt having a shaft with the second threaded surface formed externally thereon.

* * * * *